United States Patent [19]

Naito et al.

[11] Patent Number: 5,168,500

[45] Date of Patent: Dec. 1, 1992

[54] METHOD FOR AUTOMATICALLY DISCRIMINATING LOW-SPEED INTERFACE UNITS INSTALLED IN AN OPTICAL DATA TRANSMISSION APPARATUS TOGETHER WITH AUTOMATICALLY CONFIRMING THE INSTALLATION

[75] Inventors: Kanji Naito; Masumi Kurokawa, both of Yokohama, Japan; Kazuhiko Taniguchi, Richardson, Tex.

[73] Assignee: Fujitsu Limited, Kawasaki, Japan

[21] Appl. No.: 547,197

[22] Filed: Jul. 3, 1990

[30] Foreign Application Priority Data

Jul. 4, 1989 [JP] Japan .................................. 1-172267
Jul. 4, 1989 [JP] Japan .................................. 1-172268

[51] Int. Cl.[5] .............................................. H04L 1/14
[52] U.S. Cl. ...................................... 371/20.5; 371/18; 371/20.4; 371/34
[58] Field of Search ..................... 371/20.1, 20.4, 20.5, 371/34, 18, 15.1; 370/13

[56] References Cited

U.S. PATENT DOCUMENTS

| | | | |
|---|---|---|---|
| 3,453,592 | 7/1969 | Yoshiteru | 371/34 |
| 4,347,609 | 8/1982 | Fukuyama | 371/34 |
| 4,376,998 | 3/1983 | Abbott | 371/71 X |
| 4,631,719 | 12/1986 | Huffman | 371/20.5 X |

*Primary Examiner*—Charles E. Atkinson
*Assistant Examiner*—Allen M. Lo
*Attorney, Agent, or Firm*—Staas & Halsey

[57] ABSTRACT

Code data of input type and output type low-speed interface units installed in one and other optical data transmission apparatus, placed opposite to and operatively connected to each other, are compared automatically in the one and the other optical data transmission apparatus respectively with code data of input type and output interface units in the other optical data transmission apparatus, sent from the other to the one optical data transmission apparatus and with code data of input type and output interface units in the one optical data transmission apparatus, sent from the one to the other optical data transmission apparatus.

8 Claims, 6 Drawing Sheets

METHOD FOR AUTOMATICALLY DISCRIMINATING LOW-SPEED INTERFACE UNITS INSTALLED IN AN OPTICAL DATA TRANSMISSION APPARATUS TOGETHER WITH AUTOMATICALLY CONFIRMING THE INSTALLATION

BACKGROUND OF THE INVENTION

1. Field of the Invention

The present invention relates to optical data transmission apparatus including low-speed interface units, and in particular, to a method for automatically discriminating low-speed interface units installed in the optical data transmission apparatus together with automatically confirming the installation of the low-speed interface units that are occasionally installed in the optical data transmission apparatus in compliance with data newly required to be transmitted through the optical data transmission apparatus.

2. Description of the Related Art

FIG. 1 shows a block diagram of typical optical data transmission apparatus of the related art, citing an instance of optical data transmission apparatuses 100 and 200 provided in stations A and B respectively. Stations A and B are placed opposite to each other at a distance as far as 50 km, and data transmission is performed between the stations through the distance by using optical transmission means.

The optical data transmission apparatus 100 in station A comprises a signal transmitter 101, a signal receiver 102 and a control unit 103. As in same as optical data transmission apparatus 100, optical data transmission apparatus 200 in station B comprises a signal transmitter 201, a signal receiver 202 and a control unit 203. The signal transmitter 101 includes input type low-speed interface units (IIU) 1, a multiplexing unit (MUX) 2 and an optical signal sending unit (OS) 3, and same as signal transmitter 101, signal transmitter 201 includes IIU 7, MUX 8 and OS 9. The signal receiver 102 in station A includes an optical signal receiving unit (OR) 13, a demultiplexing unit (DMUX) 12 and output type low-speed interface units (OIU) 11, and same as signal receiver 102, signal receiver 202 includes OR 4, DMUX 5 and OIU 6. In the above, IIUs 1 and 7, and OIUs 11 and 6 comprise the same number of units respectively, and the units in IIU 1 correspond to the units in OIU 6 and the units in IIU 7 correspond to the units in OIU 11 in regard to the sorts of the data to be transmitted, respectively. The stations A and B are transmissively connected so that an optical signal from OS 3 in signal transmitter 101 is sent to OR 4 in signal receiver 202 through an optical transmission line 301 and the optical signal from OS 9 in signal transmitter 201 is sent to OR 13 in signal receiver 102 through an optical transmission line 302.

Generally, data sent between stations, like stations A and B, are divided into two categories. One is a data, which will be called a "payload data" hereinafter, required by a client to send between the stations; and the other is a liaison data, which will be called "control data" hereinafter, used for maintaining and/or controlling the optical data transmission apparatus in the stations. The payload data are transmitted on a plurality of ordinary channels and the control data is usually transmitted on an overhead bit (OHB) channel.

In FIG. 1, payload data are transmitted between stations A and B as follows: payload data to be sent from station A to station B are sent to the units (UNIT-1 to UNIT-n) of IIU 1 in signal transmitter 101 in compliance with the sort of the payload data and interfaced respectively so as to be multiplexed by the following MUX 2; a multiplexed signal from MUX 2 is sent to OS 3 and converted to an optical signal; the optical signal from OS 3 is transmitted through the optical transmission line 301 and received at OR 4 in signal receiver 202; the optical signal received at OR 4 is converted to an electric signal and sent to DMUX 5; the electric signal sent to DMUX 5 is demultiplexed; and a demultiplexed signal from the DMUX 5 is sent to the units (UNIT-1' to UNIT-n') of OIU 6 so as to be interfaced to the payload data respectively.

Concretely explaining the above by citing an instance of transmitting telephone signals, the telephone signals are transmitted from station A to B as follows: 45 megabit/sec (Mb/s) data produced by multiplexing telephone signals at telephone switchboards, not depicted in FIG. 1, are sent to the units (UNIT-1 to UNIT-n) of IIU 1 and interfaced, for instance, inverted from bipolar signals to unipolar signals; the interfaced (unipolar) signals from IIU 1 are sent to MUX 2 and multiplexed to 1.8 gigabit/sec (Gb/s) data thereby; the 1.8 Gb/s data (multiplexed signal) is sent to OS 3 and converted to an optical signal; the optical signal from OS 3 is transmitted to OR 4 in signal receiver 202 through the optical transmission line 301; the optical signal is converted to an electric signal at OR 4; the electric signal from OR 4 is demultiplexed by DMUX 5; and the demultiplexed signals from DMUX 5 are sent to the units (UNIT-1' to UNIT-n') of OIU 6 and interfaced to the 45 Mb/s data respectively.

The transmission of payload data are performed from station B to A same as the above. That is: payload data sent to signal transmitter 201 are interfaced by IIU 7; interfaced signals from IIU 7 are multiplexed by MUX 8; a multiplexed signal from MUX 8 is sent to OS 9 so as to be converted to an optical signal; the optical signal from OS 9 is transmitted to OR 13 in signal receiver 102 through optical transmission line 302; the optical signal received at OR 13 is converted to an electric signal and demultiplexed by DMUX 12; and the demultiplexed signals from DMUX 12 are sent to OIU 11 and interfaced to the payload data.

In the above transmission of the payload data between stations A and B, the numbers of units of IIU 1 and OIU 6 and of IIU 7 and OIU 11 are determined by sorts of payload data. Therefore, when other new sorts of payload data are required to be sent between stations A and B, units corresponding to the new sorts of payload data must be installed to IIUs 1 and 7 and OIUs 6 and 11 respectively.

In FIG. 1, it is looked as if the number of units in each IIU and OIU is "n". However, a unit depicted by a dotted box marked by subsidiary numbers "k" in IIUs 1 and 7 or "k'" in OIUs 6 and 11, for example UNIT-k in IIU 1 or UNIT-k' in OIU 6, represents a unit to be newly installed in compliance with a required new sort of payload data, so that the number of units installed in each IIU and OIU is "n−1" before newly installing the unit marked by "k" or "k'" thereto. The unit marked by "k" or "k'" will be called the "UNIT-k" or "UNIT-k'" respectively hereinafter. In other words, FIG. 1 shows a case that each IIU and OIU has n positions of units to be installed and has n−1 positions of units having been installed.

In FIG. 1, when a payload data corresponding to UNIT-k is required to be sent between stations A and B, UNIT-k must be installed in IIUs 1 and 7 respectively and UNIT-k' must be installed in OIUs 6 and 11 respectively. The installation of the UNITs-k and UNITs-k' is performed by a field installer individually at stations A and B. In the related art, after the installation is over at stations A and B, confirmation whether the installation is performed correctly is performed by a professional operator of the control units 15 and 25. When the installation is confirmed so as to be done correctly, all the units installed in IIUs and OIUs in stations A and B are started by the operators at stations A and B. Such discrimination and confirmation of the units of IIUs and OIUs performed in stations A and B are the subject of the present invention. That is, in the related art, the confirmation of the installation has been performed by operators, manually treating control units 103 and 203 individually in stations A and B. Different from the above related art, in the present invention, the discrimination and confirmation are performed automatically by a discriminating system including improved control units in stations A and B. The details of the related art will be explained, citing an instance of station B in reference to FIG. 2.

In FIG. 2, the same reference numeral or symbol as in FIG. 1 designates the same apparatus or unit as in FIG. 1. Every unit of OIU 6 and that of IIU 7 have code data corresponding to a sort of payload data. For instance, cord "09" is used for DS3 interface and cord "03" is used for DS1/DS2 convert module interface; wherein, DS3 and DS1/DS2 convert modules are well known as the typical interfaces, in American National Standard for Telecommunications.

After UNIT-k and UNIT-k' are newly installed in IIU 1 and OIU 11 respectively in optical data transmission apparatus 100 and in IIU7 OIU 6 and IIU 7 respectively in optical data transmission apparatus 200 by the field installers in stations A and B respectively, the professional operators confirm whether the UNITs-k and UNITs-k' are installed in correct positions in stations A and B. In the related art, the discrimination and confirmation are performed in station B as follows: in FIG. 2, the control unit 203 includes a micro processing unit (MPU) 203-1; under operation, which is performed by the operator in station B, of terminal board 25 in station B, MPU 203-1 sends selecting signals (SEL-1' to SEL-n') to OIU 6 and selecting signals (SEL-1 to SEL-n) to IIU 7 respectively in a polling cycle such as 0.5 sec, for polling the code data of units installed in OIU 6 and IIU 7. The polled code data from OIU 6 and IIU7 are sent back to MPU 203-1 through data buses DB-1 and DB-2 respectively and displayed on a display unit, not depicted in FIG. 2, provided to terminal board 25; the operator in station B operates terminal board 25 for discriminating and confirming whether the install positions of UNIT-k' in OIU 6 and UNIT-k in IIU 7, observing the display unit; and if the positions are confirmed so as to be correct, the operator operates MPU 203-1 through terminal board 25 so that the units of OIU 6 and IIU 7 start to operate by start signals START-1' to START-n' and START-1 to START-n sent from MPU 203-1 to OIU 6 and IIU 7 respectively. Same as the above, in station A, the discrimination and confirmation of the units installed in IIU 1 and OIU 11 and re-starting the units if the confirmation results are correctly performed by the operator in station A, observing the indicator unit and operating MPU in control unit 103 through terminal board 15. Thus, in the related art, the discrimination and confirmation of the units installed in IIU and OIU and re-starting the operation of the units must be performed by manually operating the MPU in the control unit through the terminal board at each station, which has been too much complicated to a field worker for installation, who will be called a "field installer" hereinafter. Accordingly, in the related art, the professional operator who can treat the MPU through the terminal board is required to be dispatched to each station.

In addition to the problem mentioned above, there is another problem for the field installer. In case of FIGS. 1 and 2, UNITs-k and UNITs-k' are newly installed in IIUs and OIUs in stations A and B respectively in compliance with the transmission of a new sort of payload data. This means that there are some spare positions for installing the new units of IIU and OIU in FIGS. 1 and 2. However, it occurs that even though all positions for the units are occupied, still other units are required to be installed in IIUs and OIUs in compliance with other sorts of payload data. Usually, MUX and DMUX have sections corresponding to the sorts of the payload data. Therefore, when there is possibility of transmitting new sorts of payload data, sections corresponding to the new sorts of payload data are previously provided in MUX and DMUX and switching units for selecting the sections are provided in MUX and DMUX or in IIU and OIU.

FIG. 5 shows a case of providing a switching unit 61 in OIU 6 and a switching unit 71 in IIU 7 in station B. In FIG. 5, the same reference numeral or symbol as in FIG. 2 designates the same unit or station as in FIG. 2. In the related art, switching unit 61 includes switching elements SW-1' to SW-n' and switching unit 71 includes switching elements SW-1 to SW-n, and switching units 61 and 71 communicate to each other. FIG. 5 shows a case that three sections are provided in DMUX 5 and MUX 8 respectively, corresponding to three sorts of payload data to be interfaced by each unit of OIU 6 and IIU 7. For example, when the switching element is switched to connect with an upper position as shown in SW-1' or SW-1 in FIG. 3, the payload data is a sort of data to be interfaced from DS 1 to VT 1.5. When the switching element is switched to connect with a middle position as shown in SW-2' or SW-2 in FIG. 3, the payload data is a sort of data to be interfaced from DS 1 to DS 2. When the switching element is switched to connect with a down position as shown in SW-k' or SW-k in FIG. 3, the payload data is a sort of data to be interfaced from a bipolar signal to a unipolar signal in DS 3. When signals mentioned above are output from DMUX 5 and input to MUX 8 respectively, UNIT-1' to UNIT-n' in OIU 6 and UNIT-1 to UNIT-n in IIU 7 are installed so that each of the units corresponds to respective sort of signal. Each unit of OIU 6 and IIU 7 has a data code corresponding to the sort of payload data. Therefore, in the related art, when the units of OIU 6 and IIU 7 are installed to corresponding to the sorts of payload data, MPU 203-1 in control unit 203 gathers the data code from the units in OIU 6 and IIU 7 to MPU 203-1 through data buffers DB-1 and DB-2 respectively and sends switching signals to SW-1' to SW-n' in SW 61 and to SW-1 to SW-n in SW 71 respectively so that the switch elements are connected to the sections of the DMUX 5 and MUX 8 so as to correspond to the units in OIU 6 and IIU 7 respectively. Thus, in the related art, the switching is performed automatically by MPU 203-1. However, there has been a problem that if a wrong unit is installed in OIU 6 or IIU 7 because of a mistake due to the field installer, the switching is performed in accordance with the wrong code data from the wrong unit automatically by MPU 203-1, so that wrong connection is performed by a switching element, however nobody knows about the wrong connection.

SUMMARY OF THE INVENTION

Therefore, an object of the present invention is to improve a field work of discriminating and confirming the units installed in IIUs and OIUs in the optical data transmission apparatuses, placed opposite to each other, so that the field work can be performed only by a field installer, not requiring a professional operator.

Another object of the present invention is to reduce field installation costs having been spent on the field worker.

Still another object of the present invention is to increase reliability of the field work.

The above objects are accomplished by permitting the MPUs of the control units in the apparatuses, e.g. the apparatuses at stations A and B, automatically transmit the code data of the units installed in IIU and OIU in each station from station A to station B and vice versa by using OHB channels running between stations A and B, and automatically compare code data of the units installed in IIU and OIU in station A with the code data of IIU and OIU in station B, when the code data is transmitted from station B to A and also to compare the code data of the IIU and OIU in station B with the code data of the IIU and OIU in station A, when the code data is transmitted from station A to B.

Thus the units installed in IIU and OIU in each optical data transmission apparatus in stations A and B placed opposite to each other are discriminated and confirmed whether they are correctly installed automatically by MPU in each optical data transmission apparatus. The start of each MPU is performed by a field installer dispatched to stations A and B respectively, not requiring any help of a professional operator for operating MPU.

DESCRIPTION OF THE PREFERRED EMBODIMENTS

Figure 1:
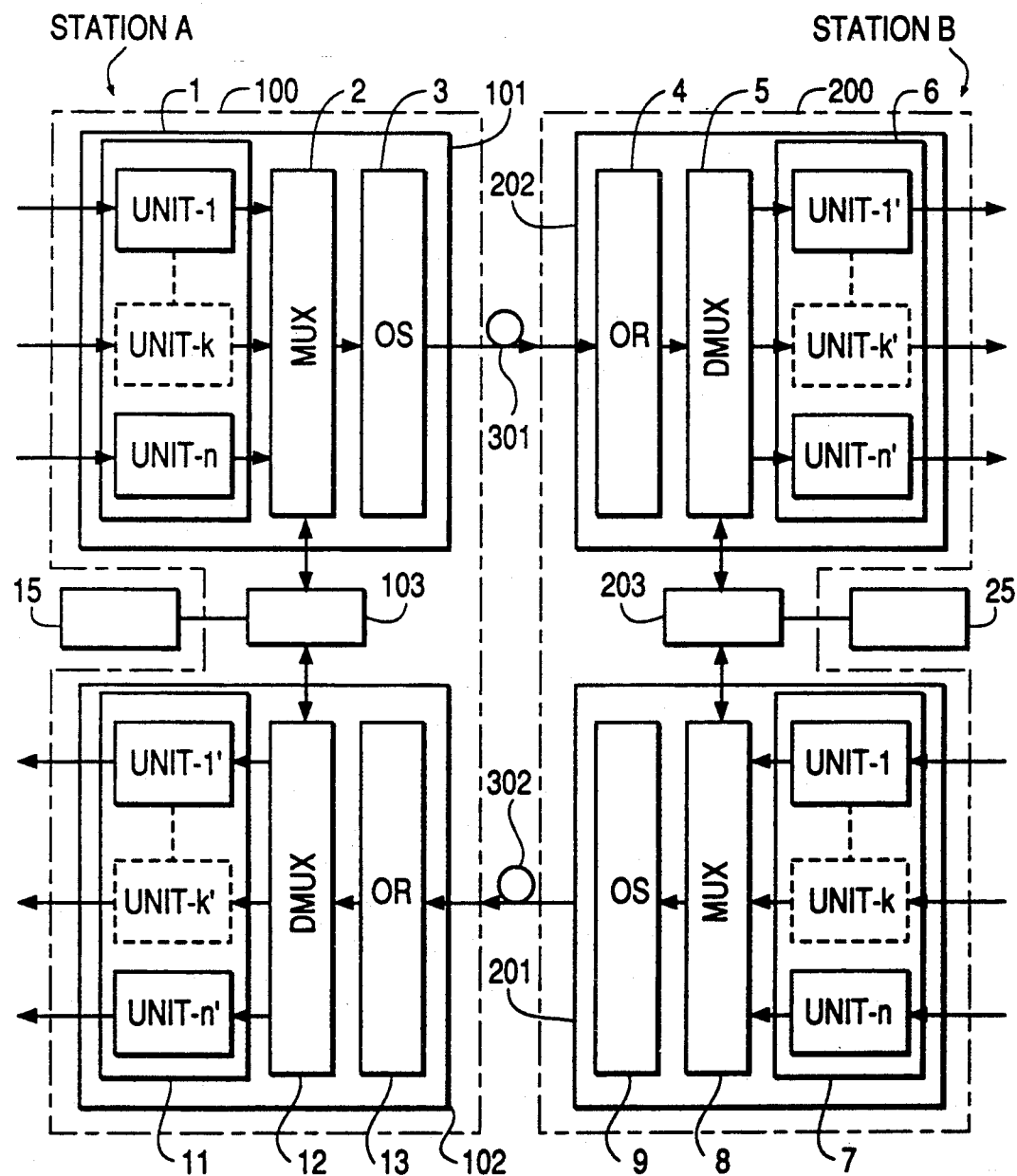
FIG. 1 is a block diagram of typical optical data transmission apparatuses of the related art, provided in stations A and B.

For the sake of comparing a preferred embodiment of the present invention with the prior art, the embodiment will be explained with an optical data transmission apparatus in station B in reference to FIG. 3. In FIG. 3, the same reference numeral or symbol as in FIG. 2 designates the same unit or part as in FIG. 2.

Figure 2:
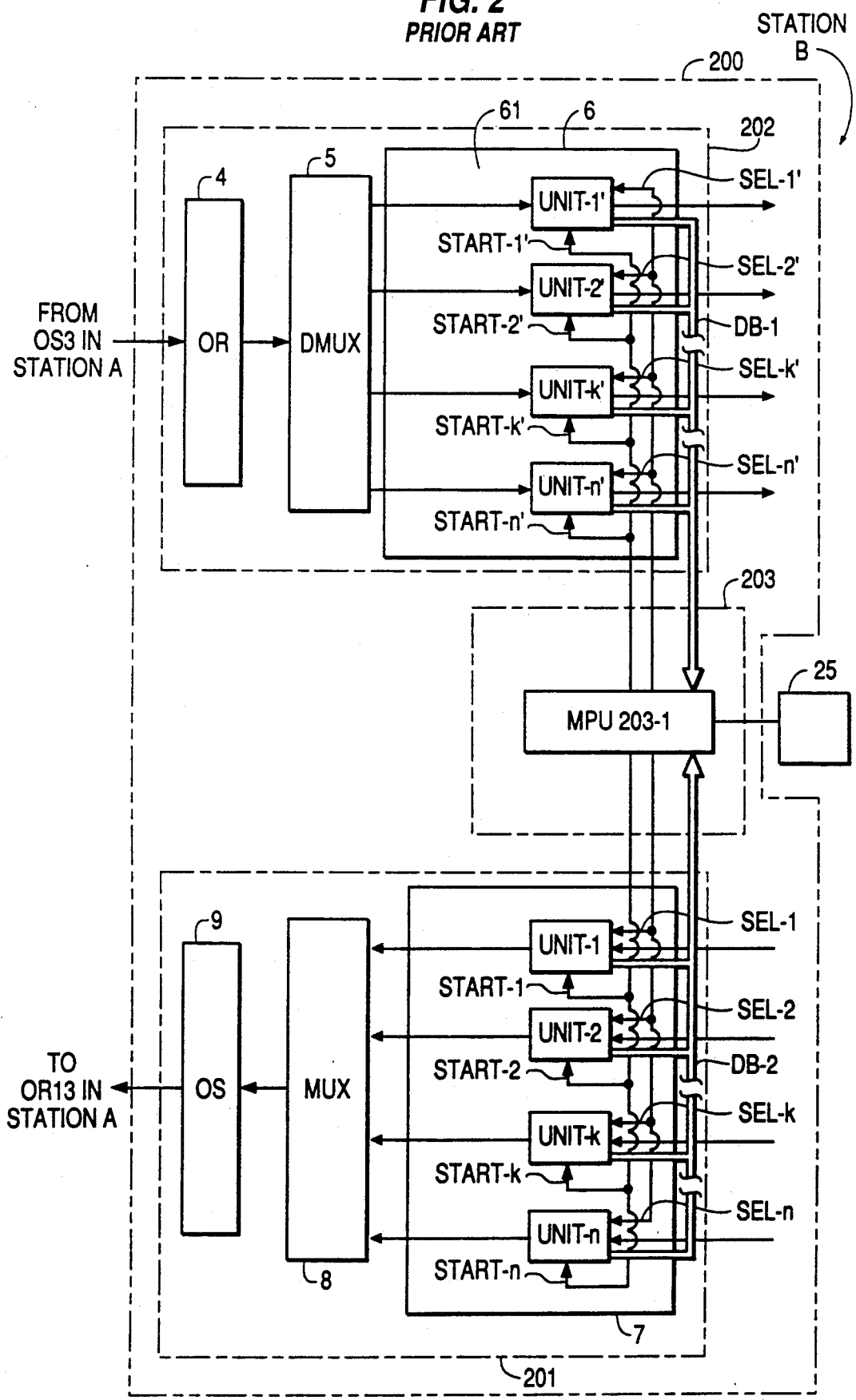
FIG. 2 is a block diagram of an optical data transmission apparatus in station B, to which the prior art method for discriminating low-speed interface units of the apparatus and confirming the installation of the units is applied.
Figure 3:
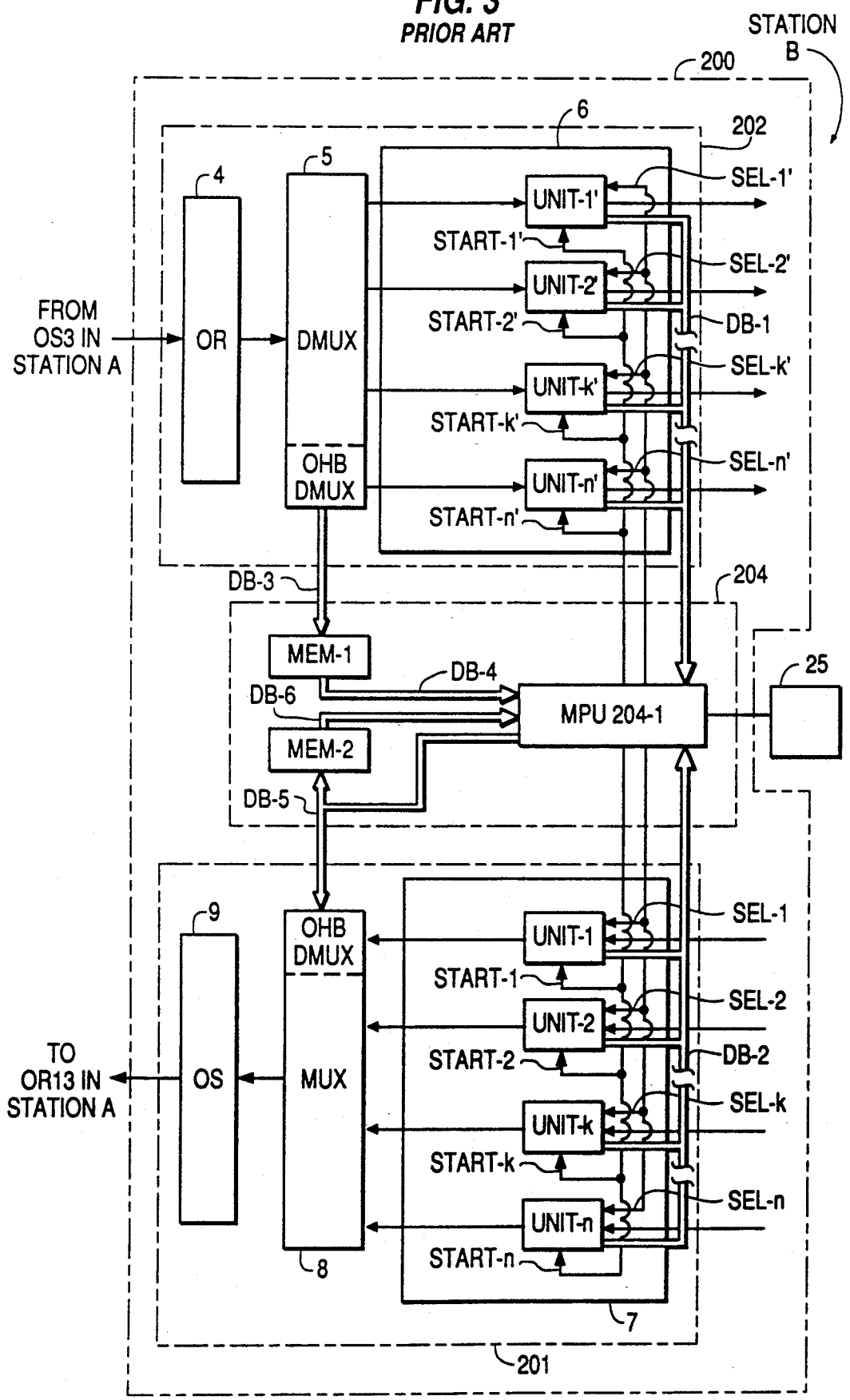
FIG. 3 is a block diagram of an optical data transmission apparatus in station B, to which a method embodying the present invention for discriminating low-speed interface units of the apparatus and confirming the installation of the units is applied.

In FIG. 3, station B includes a control unit 204 which is functionally same as the control unit 203 in FIG. 2 but improved by having, a data bus (DATA BUS) DB-3 provided from DMUX 5 to control unit 204 and DATA BUS DB-5 between MUX 8 and control unit 204. The control unit 204 includes MPU 204-1 same as MPU 203-1 in FIG. 2, however having processing capacity larger than that of MPU 203-1 and memory units MEM-1 and MEM-2.

There is no depiction about station A in FIG. 3, however, station A also has the same configuration as in station B shown in FIG. 3.

After the units K and K' are installed in IIUs 1 and 7 and OIUs 11 and 6 in stations A and B by the field installers at stations A and B, the field installers at stations A and B contact to each other through the OHB channel so as to perform the discrimination and confirmation of the units installed in the IIUs and the OIUs in stations A and B by operating control units 15 and 25 through terminal boards 15 and 25 respectively. In station B shown in FIG. 3 for example, the discrimination and confirmation of the units installed in IIU 7 and OIU 6 are performed automatically by control unit 204, in particular, by MPU 204-1 in control unit 204 in accordance with the following steps:

(1) (RECEIVE 1st AND 2nd CODE DATA FROM STN-A)

code data, which will be called first code data hereinafter, of the units installed in IIU 1 and code data, and second code data, of the units installed in OIU 11 in station A (STN-A) (see FIG. 1) are sent respectively to station B (STN-B) through the OHB channel running along optical transmission line 301 so as to appear at an OHB channel section of DMUX 5, automatically by the MPU in the control unit in STN-A through terminal board 15 operated by a field installer at STN-A (see FIG. 1);

(2) (TRANSFER 1st AND 2nd CODE DATA TO MEM-1)

the first and the second code data at the OHB channel section of DMUX 5 are transferred respectively to MEM-1 through data bus DB-3 automatically by MPU 204-1;

(3) (POLL 3rd AND 4th CODE DATA)

code data, which will be called third code data hereinafter, of the units in IIU 7 and code data, which will be called fourth code data hereinafter, of the units in OIU 6 are polled respectively by selecting signals SEL-1 to Sel-n and SEL-1' to Sel-n' provided from MPU 204-1, automatically by MPU 204-1;

(4) (TRANSFER 3rd AND 4th CODE DATA TO MEM-2)

the third and the fourth code data are transferred respectively to MEM-2 through DB-1, DB-2 and DB-5 automatically by MPU 204-1;

(5) (TRANSFER 3rd AND 4th CODE DATA TO MUX)

the third and the fourth code data are also transferred respectively to an OHB channel section of MUX 8 through DB-2 and DB-5 automatically by MPU 204-1;

(6) (SEND 3rd AND 4th CODE DATA TO STN-A)

the third and the fourth code data transferred to MUX 8 are transmitted to STN-A through the OHB channel running along optical transmission line 302 (see FIG. 1) automatically by MPU 204-1, which is functionally same as the first and the second code data are sent from STN-A to STN-B, which has been described in step (1);

(7) (COMPARE 3rd, 4th CODE DATA WITH 2nd, 1st CODE DATA)

the third and the fourth code data stored in MEM-2 are read into MPU 204-1 through a data bus DB-6 and the first and the second code data stored in MEM-1 are read into MPU 204-1 through a data bus DB-4 so that the third code data are compared with the second code data and the fourth code data are compared with the first code data respectively in MPU 204-1 automatically, wherein, these comparisons are performed so that the code data of IIU in one station and OIU in other station set opposite to each other in a train of data transmission flow are compared;

(8) (START TO OPERATE IIU AND OIU IN STN-B)

when the comparing results in step (7) are correct, in other words, when the third code data are same as the second code data and the fourth code data are same as the first code data, IIU 7 and OIU 6 begin operating by start signals START-1 to n and START-1' to n' respectively, automatically by MPU 204-1, which means that STN-B starts to operate normally;

(9) (SEND WAIT SIGNAL TO STN-A)

when there is at least one fault in the comparing results in step (7), a wait signal is sent to STN-A automatically by MPU 204-1; and

(10) (RECHECK THE STATE OF INSTALLATION)

when the wait signal is sent to STN-A, a wait signal sent from STN-A is received at STN-B as far as units related to data transmission in STNs-A and B operate normally and optical data transmission lines 301 and 302 are normal, then the field installer at STN-B rechecks the installed state of units in IIU 7 and OIU 6, until the wait signal sent from STN-A disappears and STN-B starts to operate normally in accordance with MPU 204-1.

Figure 4:
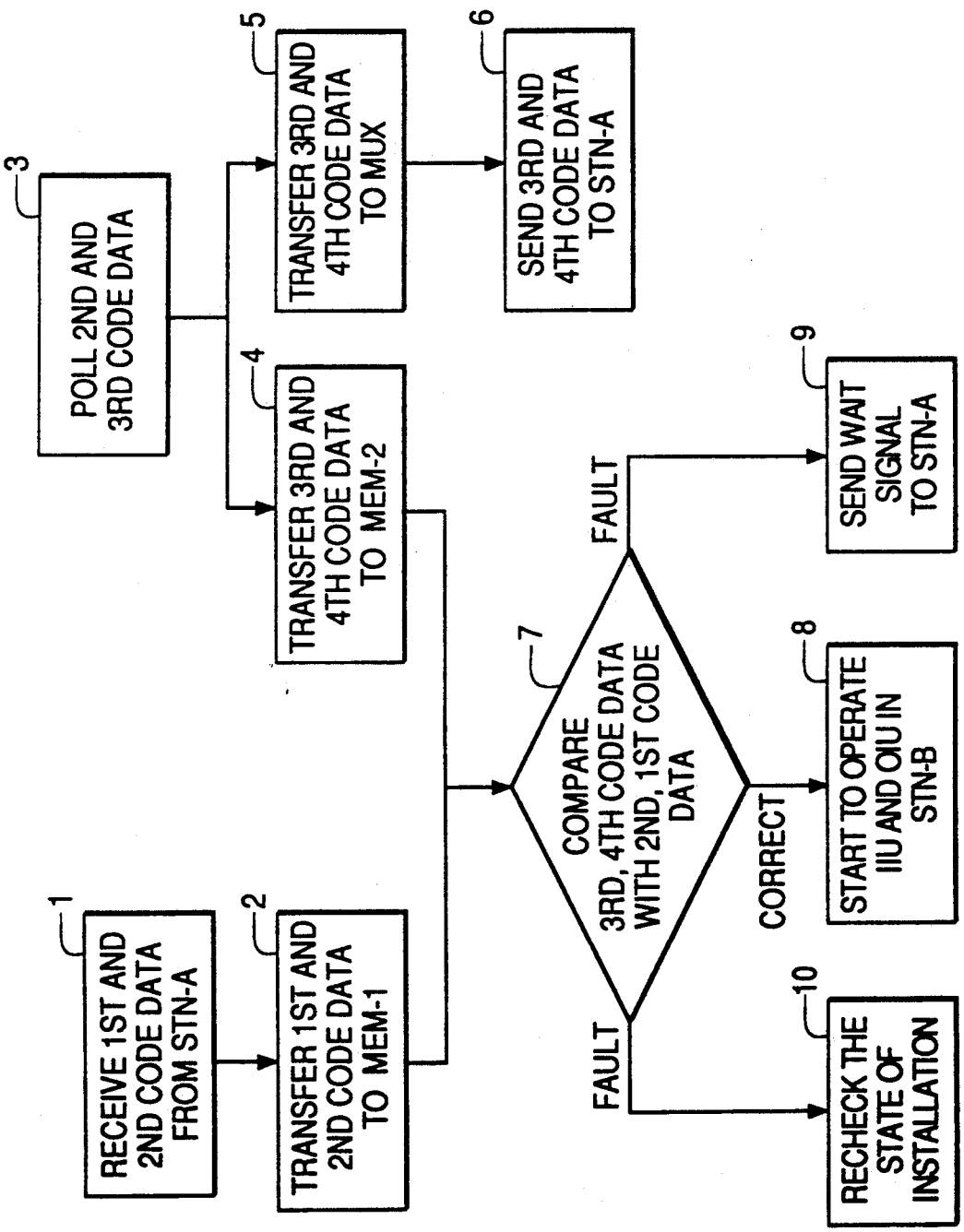
FIG. 4 is a flow chart for explaining the method embodying the present invention.

The above steps are shown by a flow chart in FIG. 4. The same numerals and captions as in the description of the above steps are used in FIG. 4. Incidently, in the prior art, the steps automatically performed by CPU 204-1 in the flow chart of FIG. 4 had to be performed one by one by a professional operator, because the steps have been too hard to be performed by the field installer.

Thus, in stations A and B, the discrimination and the confirmation of the units installed in IIU and OIU are automatically performed by the MPU in the control unit and the operation of the terminal board for controlling the MPU is much improved so as to be performed only by the field installer.

Figure 5:
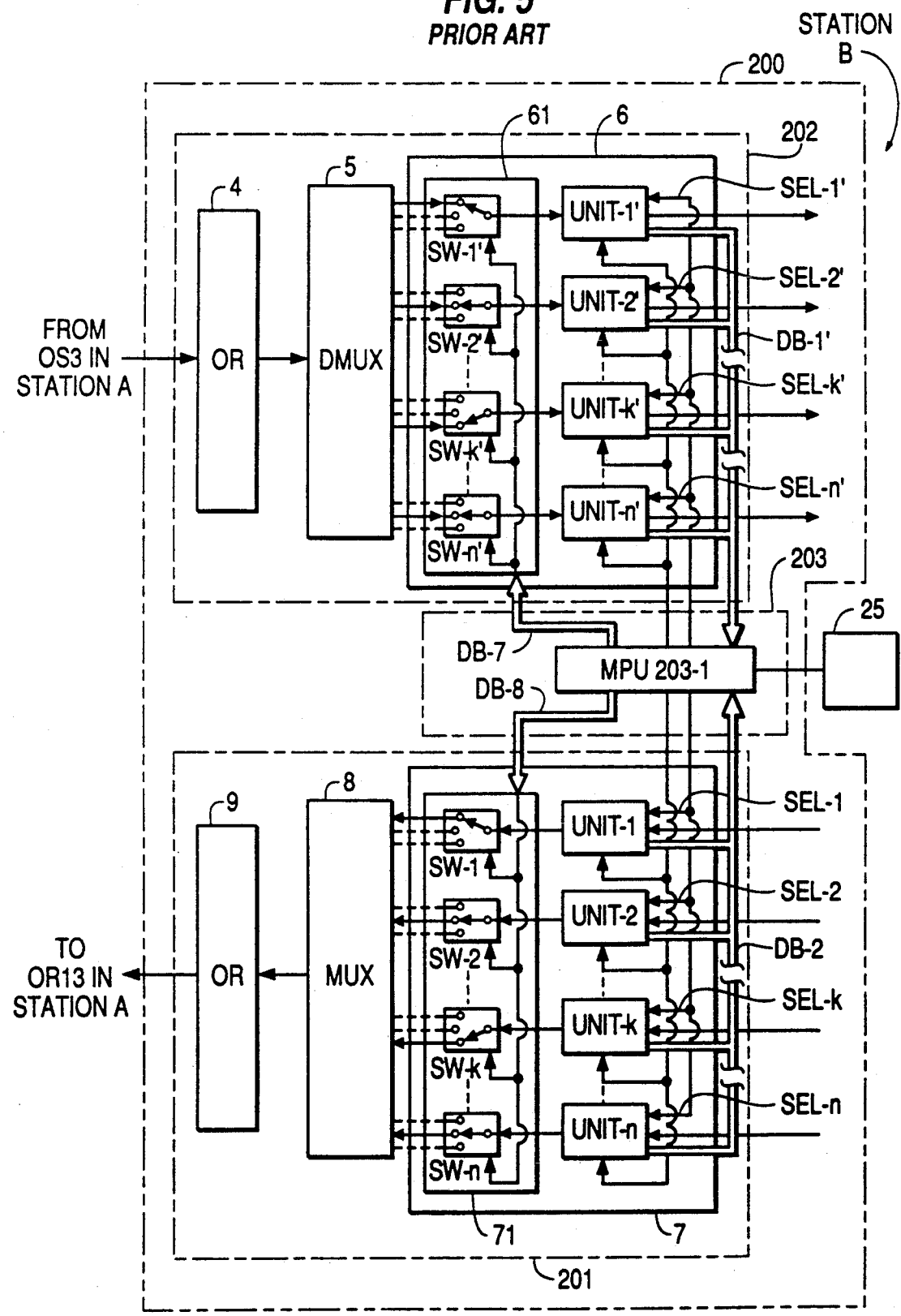
FIG. 5 is a block diagram of an optical data transmission apparatus, including switching unit for connecting the units installed in low-speed interface units with a demultiplexing unit and with a multiplexing unit in station B, to which the prior art method for operating the switching unit is applied.

When optical data transmission apparatuses 100 and 200 in stations A and B include the switching unit in OIU and IIU respectively as shown in FIG. 5, a problem occurred in the related art as stated before. However, the method embodying the present invention also solves this problem. That is, even though the apparatus includes the switching unit, the units in OIU and IIU can be discriminated and confirmed automatically by the MPU in each station.

As described in the steps in reference to FIG. 4, the discrimination and confirmation of the units in OIU and IIU are performed at the one station (station B) by using the code data of units in IIU in other station (station A) as reference data and by using the OHB channel for transmitting the reference data between stations A and B. Accordingly, if a trouble such that the reference data are not sent to station B from station A occurs, the discrimination and confirmation could not be performed by the method. Such trouble will probably occur in case that the field installer at station A is absent or there is an accident on a transmitting route of the reference data between stations A and B.

Figure 6:
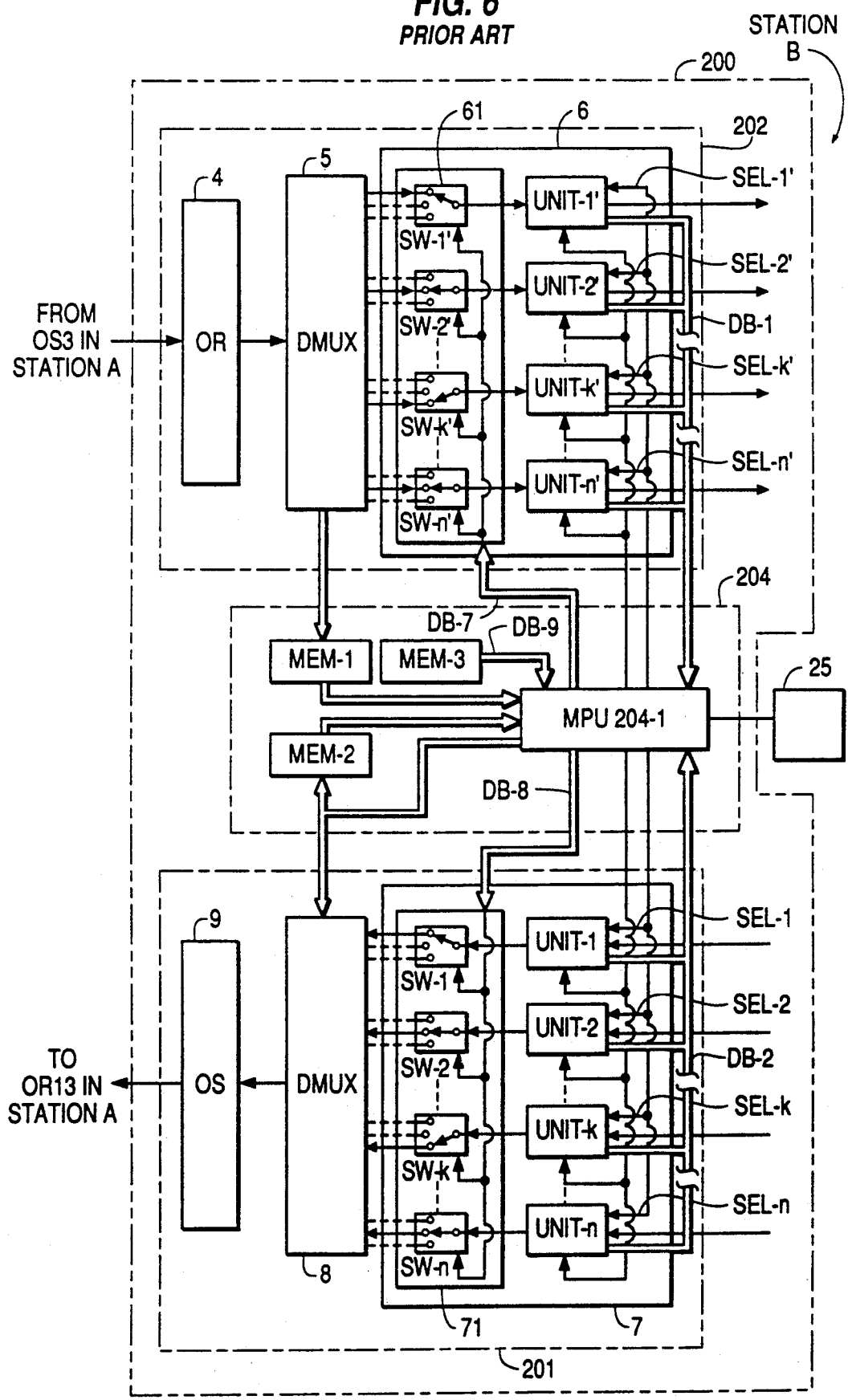
FIG. 6 is a block diagram of an optical data transmission apparatus, including the switching units, in station B, to which a method embodying the present invention is applied for discriminating and switching low-speed interface units of the apparatus is applied.

For avoiding such trouble from occurring, a method is required to be added to the steps described in reference to FIG. 4. The additional method will be described in reference to FIG. 6, citing an instance of station B same as in FIG. 3. In FIG. 6, the same reference numeral or symbol as in FIG. 3 or 5 designates the same unit or apparatus as in FIG. 3 or 5.

In FIG. 6, a memory MEM-3 and a data bus DB-9 connected between MEM-3 and MPU 204-1 are added in control unit 204. The field installer at station B operates terminal board 25 so that data code, which will be called fifth data code hereinafter, for new units intended to be installed or exchanged in IIU 7 and OIU 6 are stored in MEM-3. Then, the field installer installs the new units or exchanges to new units in OIU 6 and IIU 7 and starts to operate MPU 204-1 through terminal board 25. Then, same as performed in FIG. 4, the third and the fourth code data are transferred to MEM-2 and stored therein. And, the third and fourth code data are compared with the fifth code data stored in MEM-3, automatically by MPU 204-1. That is, the fifth code data stored in MEM-3 are used instead of the first and second code data stored in MEM-1. When the third and fourth code data are confirmed to be correct by the comparison, the switching elements (SW-1' to SW-n') in switching unit 61 and the switching elements (SW-1 to SW-n) in switching unit 71 are switched in accordance with the switching signals sent from MPU 204-1 through DB-7 and DB-8 respectively, automatically by MPU 204-1. Different from the steps described before in reference to FIGS. 3 and 4, the above steps described in reference to FIG. 6 are performed individually in station B. The same steps as in FIG. 6 are performed also individually in station A. In the additional method performed in reference to FIG. 6, the field installer must store the fifth code data by operating terminal board 25. This operation is not complicated, and the other confirmation of the units installed in OIU 6 and IIU 7 and the switching of switching units 61 and 71 are performed automatically by MPU 204-1. Therefore, the additional method performed in reference to FIG. 6 is carried out only by the field installer, not requiring any help of a professional operator of MPU.

In the above description of the steps described in reference to FIGS. 3 and 6, the discrimination and confirmation of the units installed in IIU 7 and OIU 6 are performed in case of the optical data transmission apparatus 200 provided in station B. However, such discrimination and confirmation are not only applied to the optical data transmission apparatus but also to a general data transmission apparatus such as a radio wave data transmission apparatus. In case of the general data transmission apparatus, a general data signal receiver and a general data signal transmitter are used for signal receiver 202 and signal transmitter 201 respectively and a data signal receiving unit and a data signal transmitting unit can be used instead of optical signal receiving unit OR 4 and optical signal sending unit OS 9 respectively (see FIG. 1), which is well realized by a person skilled in the art.

What is claimed is:

1. A method for discriminating input interface units and output interface units installed in data transmission apparatuses and operatively connected by data transmission lines to each other, and for confirming whether said input and output interface units are installed correctly, said method comprising the steps of:

(a) sending first code data from a first input interface unit in a first data transmission apparatus, and second code data from a first output interface unit in the first data transmission apparatus to a second data transmission apparatus through one of the data transmission lines;

(b) comparing third code data from a second input interface unit in the second data transmission apparatus with the second code data;

(c) comparing fourth code data from a second output interface unit in the second data transmission apparatus with the first code data;

(d) sending the third code data and the fourth code data from the second data transmission apparatus to the first data transmission apparatus through another one of the data transmission lines;

(e) comparing the first code data with the fourth code data sent from the second data transmission apparatus; and (f) comparing the second code data with the third code data sent from the second data transmission apparatus.

2. A method according to claim 1, wherein step (a) includes the sub-step of:

sending the first code data and the second code data from the first data transmission apparatus to the second data transmission apparatus by using an over head bit channel and wherein step (d) includes the sub-step of:

sending the third code data and the fourth code data from the second data transmission apparatus to the first data transmission apparatus by using the over head bit channel.

3. A method according to claim 1, wherein each of steps (a) and (b) includes the sub-steps of:

automatically comparing the third code data with the second code data and the fourth code data with the first code data respectively by using a first data processing means, and automatically comparing the first code data with the fourth code data and the second code data with the third code data respectively by using a second data processing means.

4. A method according to claim 3, said method further comprising the steps of:

(g) automatically providing a wait signal from the second data transmission apparatus to the first data transmission apparatus when at least one fault results from the comparison of the third and the fourth code data with the second and the first code data respectively; and (h) automatically providing another wait signal from the first data transmission apparatus to the second data transmission apparatus when at least one fault results from the comparison of the first and the second code data with the fourth and the third code data respectively.

5. A method for discriminating input interface units and output interface units installed in data transmission apparatuses and operatively connected by data transmission lines to each other, and for confirming whether the input and output interface units are installed correctly, said method comprising the steps of:

(a) identifying first code data from an input interface unit in a first data transmission apparatus and second code data from an output interface unit in the first data transmission apparatus;

(b) storing third code data in the first data transmission apparatus, which represents the input interface units and the output interface units of the first data transmission apparatus; and (c) selectively comparing the first and the second code data with the third code data.

6. A method according to claim 5, further comprising the steps of:

(d) identifying fourth code data from an input interface unit in a second data transmission apparatus and fifth code data from an output interface unit in the second data transmission apparatus, the second data transmission apparatus being operatively connected to the first data transmission apparatus through one of the data transmission lines;

(e) storing sixth code data in the second data transmission apparatus, the sixth code data representing the input interface units and the output interface units of the second data transmission apparatus;

(f) selectively comparing the fourth and the fifth code data with the sixth code data.

7. A system for discriminating input interface units and output interface units installed in data transmission apparatuses and for confirming whether the installation of the input and output interface units is performed correctly, said system comprising:

a first data transmission apparatus;

a second data transmission apparatus;

a data transmission line operatively connecting the first data transmission apparatus to the second data transmission apparatus;

a multiplexing unit connected with said input interface units;

a demultiplexing unit connected with said output interface unit;

first sending means for automatically sending first code data of the input interface unit in the first data transmission apparatus and second code data of the output interface unit in the first data transmission apparatus to the second data transmission apparatus;

second sending means for automatically sending third code data of the input interface unit in the second data transmission apparatus and fourth code data of the output interface unit in the second data transmission apparatus to the first data transmission apparatus;

first comparing means, provided in the first data transmission apparatus, for automatically comparing the first and the second code data with the fourth and the third code data respectively; and second comparing means, provided in the second data transmission apparatus, for automatically comparing the third and the fourth code data with the second and the first code data respectively.

8. A system according to claim 7, further comprising:

first memory means, provided in the first data transmission apparatus, for storing fifth code data representing a number of the input interface units and the output interface units to be installed in the first data transmission apparatus;

third comparing means for automatically comparing the first and the second code data respectively with the fifth code data;

second memory means for storing sixth code data representing the number of the input interface units and the output interface units to be installed in the second data transmission apparatus; and fourth comparing means for automatically comparing the third and the fourth code data respectively with the sixth code data.

* * * * *